Oct. 23, 1962  KIYOSHI INOUE  3,060,306

ELECTRIC WELDING APPARATUS

Filed March 14, 1960

Inventor:
Kiyoshi Inoue
BY Karl F. Ross
Agent 3,060,306
ELECTRIC WELDING APPARATUS
Kiyoshi Inoue, 182 3-chome, Tamagawayoga-machi,
Setagaya-ku, Tokyo-to, Japan
Filed Mar. 14, 1960, Ser. No. 18,212
5 Claims. (Cl. 219—110)

This invention relates to an electric welding apparatus, and more particularly it relates to a new and improved electric welding apparatus which is so constructed that it can automatically control the output power in response to the variation of electric resistance at the weld points during the welding process.

Among the conventional methods of fusing or welding together two sheets of metal plate, there have been electric resistance welding methods, especially the so called spot welding method wherein the welding is carried out locally at certain space intervals.

In the said method, the distance between the welding points is established to be a certain value with consideration of the material of the work to be welded, their thickness and other dimensions, and the kind of electric power source used for welding, it being necessary to program the said value in relation to the pitch of such a part as a gear. Then, with the rotation of the gear, pressure is imparted to the welding electrode in accordance with the value of the said pitch, and the welding points are maintained in positions which are spaced at the established, constant interval.

However, said method has had the disadvantage that said distance between the weld spots which has been once established cannot be varied freely and at will; in case the work to be welded or its thickness changes, it is necessary to change, by replacement, the program controlling mechanism at each instance. In the case also of spot welding apparatuses so constructed as to feed the work at constant speed while a constant pressure is imparted to the welding electrode and to pass electric current for welding at constant intervals, it has not been feasible to vary, freely and at will, the intervals between electric current applications.

Furthermore, in the welding of thin material with ordinary welding apparatuses, there have been some cases wherein surplus welding electric energy, of greater magnitude than necessary, has been supplied to the weld points, and, not only the weld points, but also the metal surfaces in the vicinity thereof have been cut away by melting.

Therefore, it is the principal object of this invention to provide, with due consideraton of the abovementioned points, an electric welding apparatus wherein it is possible to vary, freely and at will, the distance between the weld points.

It is another object of this invention to provide an electric welding apparatus which is so constructed as to supply the optimum quantity of welding energy to the weld points.

Said objects and other objects, as will become apparent hereinafter, have been achieved, according to this invention, by controlling the welding condition in accordance with the equivalent electric resistance value at the points to be welded. In carrying this method into practice, the control of the welding condition can be attained by controlling automatically the output power of the electric power source for welding in accordance with the equivalent electric resistance at the points to be welded. For this purpose, a device for detecting the equivalent electric resistance at the points to be welded and a device for controlling the output condition of the electric power source for welding in accordance with the value detected by said detecting device may be used; or a pair of welding electrodes which are connected to the output terminals of said power source, and a circuit device, connected across said electrodes, in which the current from said power source is caused to flow in divided paths are provided, whereby the welding condition is controlled in accordance with the current which flows through said circuit device.

In the above case, the detecting device may be represented by any conventional device such as, for example, an electric relay, electromagnet or the like which operates in response to the equivalent electric resistance value at the points to be welded, said device being connected so that the output condition of the electric power source for welding is controlled in accordance with the value detected by said detecting device. One embodiment of this invention utilizes a high-frequency pulse generator for the electric power source for welding and is so constructed that the output current of the said generator is controlled by a saturable reactor, or a magnetic amplifier, which is designed to cause saturation thereof when the resistance between the weld points exceeds a certain value.

The manner in which the foregoing as well as other objects and advantages of this invention may best be achieved will be understood more fully from a consideration of the following detailed description of representative embodiments of the invention, when taken in conjunction with the accompanying drawing, in which the same or equivalent members are indicated by the same numerals, and in which.

Figure 1:
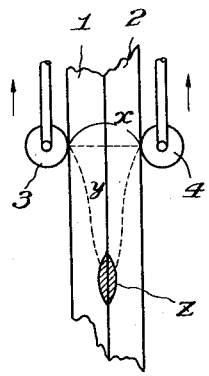
FIG. 1 is an enlarged view, with parts cut away, of the welding electrode portion of an electric welding apparatus according to the invention.
Figure 2:
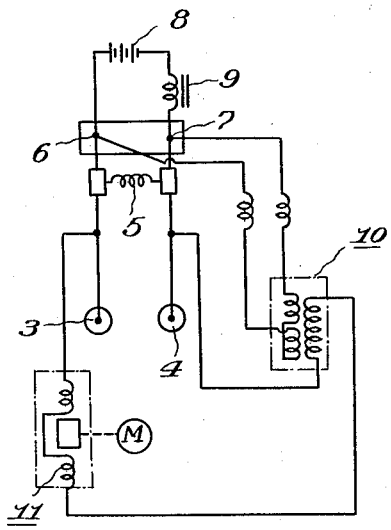
FIG. 2 is an electrical wiring diagram of the electrical system of an electric welding apparatus of this invention, in which the electrodes of FIG. 1 are used.

Referring to FIG. 1, work plates 1 and 2 to be welded are clamped between roller electrodes 3 and 4, which move in the arrow direction, said movement being caused, for example, by a driving device composed of a handle or an electric motor, an arm holding said electrodes, a screw rod driven by said handle or motor, and said driving device being not shown because it has no direct relation to the main point of this invention. A spring 5 is provided as shown in FIG. 2 in order to impart a certain pressing force between the roller electrodes 3 and 4 which are attached to electrode support points 6 and 7 in a rotatable, movable manner. The direct-current power source 8 is connected, in series with a high-frequency choking reactor 9, to the roller electrodes 3 and 4. The power source 8 is connected, in parallel, to the roller electrodes 3 and 4 for welding and to the direct-current exciting winding of a saturable reactor or magnetic amplifier 10, whereby the welding electric energy imparted to the weld points is made to be controlled by controlling the saturated or unsaturated condition of the saturable reactor 10 in response to the variation of the electric resistance at the weld points. The said saturable reactor, or magnetic amplifier, 10 is used for controlling the output current of a high-frequency pulse generator 11 and is connected in series with the said generator 11 which in turn is driven by a drive motor 12.

In cases where a plurality of sets of roller electrodes are used, a polyphase, alternating-current source is used as the generator, and the apparatus is adapted to supply the currents of the several phases to the respective electrodes.

If, as an assumption, the roller electrodes 3 and 4 are at the point of the weld point Z, the value of the resistance between the electrodes will be almost zero or close thereto. Consequently, the entire electric current from the direct-current power source 8 will flow between the electrodes, and the direct electric current of the saturable reactor, or magnetic amplifier, will be zero. Thus, when the roller electrodes are at the weld point Z, it is not possible for high-frequency welding current to flow.

However, if the roller electrodes move, the direct electric current is caused to flow in divided paths passing through the point Z and through the shortest course between the electrodes. If the electrical resistance of the said shortest course is designated by the letter $x$, and the resistance of the current path through the point Z by $y$, the joint resistance R will be as follows.

$$R = \frac{1}{\frac{1}{x}+\frac{1}{y}} = \frac{xy}{x+y}$$

In the above equation, the value of $x$ is taken to be nearly constant, but $y$ increases almost linearly with the distance of movement of the electrodes. Consequently, the direct exciting current of the saturable reactor or magnetic amplifier, which until now has been bypassed only between the electrodes 3 and 4, is caused to increase in accordance with the distance of movement of the electrodes.

However, regardless of how much the direct exciting current increases, until it saturates the iron core of the saturable reactor, said reactor is retained at high impedance as before, and high-frequency welding current cannot flow. Then, when the electrodes have moved sufficiently so that the value of $y$ has increased to a magnitude sufficient to enable the direct exciting current flow to saturate the iron core of the saturable reactor, or magnetic amplifier, 10, this reactor or amplifier becomes saturated, and its impedance changes to a low value; consequently, a high-frequency welding current is made to flow between the roller electrodes 3 and 4. Then, when the parts being welded have been fused together, and the resistance has changed to near zero value, as described above, the direct exciting current is bypassed between the electrodes, and the saturable reactor, or magnetic amplifier, again presents a high impedance as described above.

For the abovementioned iron core, one having a hysteresis characteristic of rectangular form is desirable, but said characteristic is not necessarily required in all cases. In the case of work to be welded which requires preheating, an iron core having a hysteresis characteristic of diamond form is to be recommended.

If, with the apparatus illustrated in the drawing of this disclosure, or with resistance welding apparatuses in general, electric current is made to flow while imparting an ultrasonic vibration to the parts being welded, welding with substantially high efficiency becomes possible. That is, if the said ultrasonic vibration is imparted to the parts to be welded, a local, mechanical friction is created in the said parts; the oxide films adhering from before to the parts to be welded are stripped off; and the bare metals are caused to come into mutual contact at the weld point. Then, by passing through the welding current under this condition, it is possible to accomplish this kind of welding in an ideal manner. Moreover, since the flow of said current is locally concentrated, a low value of said current is sufficient. In other terms, welding with a small-capacity power source becomes possible. Furthermore, defects commonly known as pinholes, which tend to be formed during welding of thin metal sheets by this kind of welding method, cannot possibly occur in the case of the afore-described method.

It should be mentioned that, hitherto, welding has been accomplished with use of ultrasonic energy, but, by these methods, all of the energy required for welding has been provided by only the ultrasonic source. Accordingly, an ultrasonic oscillator and an apparatus of considerably high output have been required. Furthermore, the energy losses by these methods have been high; the all-around efficiencies have been very low; and these methods have not been practical.

Figure 3:
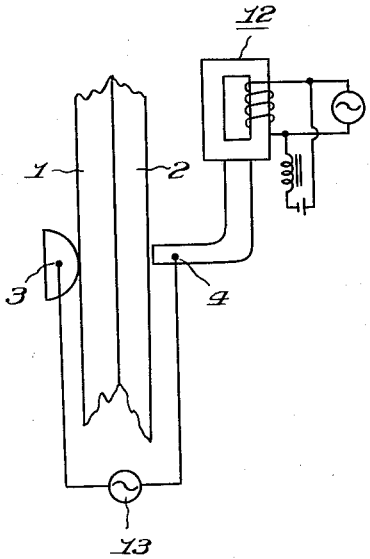
FIG. 3 is a schematic diagram, with parts cut away, showing a further improved electric welding apparatus according to the invention.

An illustrative apparatus utilizing ultrasonic waves according to this invention is illustrated in FIG. 3, wherein one electrode 4 of the welding electrodes 3 and 4 functions dually as an oscillator piece which is vibrated by an ultrasonic oscillator 12. Although, as one illustrative example of an oscillator, a magnetostriction material is used, said oscillator is not limited thereto, and the use of any other kind of oscillator is permissible. The apparatus of FIG. 3 comprises an electric power source device 13 for welding.

Representative experimental results with the apparatus illustrated in FIG. 3 are as follows:

An ultrasonic oscillator with an ultrasonic oscillation frequency of 40 kilocycles per second and an oscillation amplitude set at 2 to 3 microns was used. For the work to be welded, tantalum material of 0.005-inch thickness was used. During welding, a pressure of 10 kilograms per square centimeter was applied, and a pulse electric current of 20 amperes and pulse width of 1 ms. was applied, whereby it was possible to accomplish thorough welding. Of course, absolutely no pinholes were formed.

When the device of the type illustrated in FIG. 3 and the apparatus of the type illustrated in FIGS. 1 and 2 are used, the resistance between the electrodes is indicated as an average value. It is obvious, of course, that although this resistance is an average value, in practice, it is not detrimental in any way.

By the use of the apparatus illustrated in FIGS. 1 through 3, fabricated structures commonly called honeycombs can be welded with extreme effectiveness. As is well known, honeycombs are being used widely as stiffening material for aircraft wings. These honeycombs are fabricated by progressively welding metal sheets. However, since these metal sheets are extremely thin, the welding process has been difficult. By the use of the apparatus of this invention, however, the same welding can be accomplished accurately at constant space intervals, and the energy for welding does not become excessive. Accordingly, there is absolutely no damage such as the cutting away of the metal in the vicinity of the welds and no defects such as pinholes.

In embodying this invention, any system such as resistance, arc, or seam welding system may be used.

As described above, in the apparatus of this invention, the welding current is caused to flow only when the joint resistance between the electrodes has reached a certain value; and since the current is promptly suppressed when the weld point has been fully melted and the welding has been completed, excessive welding energy is not supplied, and no matter how thin the work material is, it cannot be cut away by melting. Even when the work material is thick, the welding current continues to flow as long as the welding is incomplete. Therefore, thorough, secure welding is possible in contrast to the case of conventional welding apparatuses wherein merely a certain quantity of welding energy has been supplied at certain intervals. Furthermore, regardless of how the material properties of the work material changes, it is not necessary to vary the composition of the apparatus of this invention, the welding energy being supplied automatically until the welding has been completed.

The apparatus of this invention has a further and unique advantage in that, by merely varying the voltage of the power source 8, it is possible to vary, freely and at will, the distance between the weld points, the control variation being effected electrically and, moreover, in a simple manner. The reason for this is that the direct exciting current of the saturable reactor varies in accordance with the magnitude of the direct-current voltage of the power source 8, and, even if the speed of movement of the roller electrodes is constant, the time which elapses until the iron core is saturated varies.

Since it is obvious that many changes and modifications can be made in the above described details without departing from the nature and spirit of the invention, it is to be understood that the invention is not to be limited to the

What I claim is:

1. An apparatus for welding together two abutting metallic bodies at a plurality of spaced locations along their interface, comprising electrode means conductively connected to said bodies on opposite sides of said interface, said electrode means including at least one electrode member in contact with one of said bodies; feed means for relatively displacing said bodies and said electrode member; pressure means for urging said bodies together over a limited area at said electrode member; a source of electric current momentarily connectable to said welding means for fusing said bodies together at said area, thereby forming a region of good electrical conductivity at the location of fusion; and circuit means including said electrode means responsive to the resistance of said bodies varying with the distance from said region of good electrical conductivity to said electrode member for connecting said source to said electrode means upon said resistance attaining a predetermined maximum.

2. An apparatus according to claim 1 wherein said welding means comprises a pair of juxtaposed electrode members each engaging one of said bodies.

3. An apparatus according to claim 2 wherein said circuit means includes a saturable reactor having a control winding, said circuit means further comprising a source of direct current connected across said electrode members and the control winding of said reactor.

4. An apparatus according to claim 2, further comprising timer means responsive to the resistance of said bodies sensed by said electrode members for regulating the duration that said source of electric current is connected to said welding means.

5. An apparatus according to claim 2, further comprising ultrasonic-oscillator means for imparting ultrasonic vibrations to at least one of said electrode members.

References Cited in the file of this patent

UNITED STATES PATENTS

| | | |
|---|---|---|
| 1,933,936 | Schnetzer | Nov. 7, 1933 |
| 2,112,716 | Smith | Mar. 29, 1938 |
| 2,846,563 | Cronin | Aug. 5, 1958 |